United States Patent

Kajimura

(10) Patent No.: US 6,983,164 B2
(45) Date of Patent: Jan. 3, 2006

(54) METHOD OF AUTOMATICALLY CONTROLLING TRANSMISSION POWER OF WIRELESS COMMUNICATION APPARATUS, AND STORAGE MEDIUM ON WHICH THE SAME IS STORED

(75) Inventor: Akihiro Kajimura, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 739 days.

(21) Appl. No.: 09/804,028

(22) Filed: Mar. 13, 2001

(65) Prior Publication Data

US 2001/0023189 A1 Sep. 20, 2001

(30) Foreign Application Priority Data

Mar. 13, 2000 (JP) .................................. P2000-068483
Jan. 15, 2001 (JP) .................................. P2001-006790

(51) Int. Cl.
H04B 1/00 (2006.01)

(52) U.S. Cl. ..................................................... 455/522
(58) Field of Classification Search ................. 455/522, 455/69, 421, 13.4, 504, 514; 370/318, 300
See application file for complete search history.

(56) References Cited

U.S. PATENT DOCUMENTS 5,722,051 A * 2/1998 Agrawal et al. .............. 455/69
5,960,361 A * 9/1999 Chen ........................... 455/522
6,058,107 A * 5/2000 Love et al. .................. 370/332
6,298,241 B1 * 10/2001 Hong .......................... 455/522

FOREIGN PATENT DOCUMENTS

| JP | A1013338 | 1/1998 |
|----|----------|--------|
| JP | 10-65612 A | 3/1998 |
| JP | 10-79776 A | 3/1998 |
| JP | 11-205861 A | 7/1999 |
| JP | 2000-49699 A | 2/2000 |

* cited by examiner

Primary Examiner—Nick Corsaro
(74) Attorney, Agent, or Firm—Birch, Stewart, Kolasch & Birch, LLP

(57) ABSTRACT

A method of automatically controlling a transmission power of a wireless communication apparatus that reduces power consumption and adjusts the transmission power to enable communication to be carried out at an optimum transmission power, and a storage medium which stores the method are provided. At a start of communication, a wireless communication apparatus performs communication while setting the transmission power to the maximum value. Each time when transmission succeeds, the transmission power is reduced by a predetermined amount. When transmission fails as a result of the reduction by the predetermined amount, retransmission is carried out with increasing the transmission power by the predetermined amount. The increased power is set as an optimum transmission power. The power is maintained until transmission fails. When transmission fails after the optimum transmission power is set, transmission power is raised to the maximum value and setting of optimum transmission power is again carried out.

24 Claims, 10 Drawing Sheets

METHOD OF AUTOMATICALLY CONTROLLING TRANSMISSION POWER OF WIRELESS COMMUNICATION APPARATUS, AND STORAGE MEDIUM ON WHICH THE SAME IS STORED

BACKGROUND OF THE INVENTION

1. Field of the Invention

The present invention relates to a method of automatically controlling a transmission power of a wireless communication apparatus, and also to a storage medium on which the method is stored.

2. Description of the Related Art

Most of wireless communication apparatuses transmit data in units of block, to a base station. In the case where data transmission has been successfully carried out, an acknowledge (ACK) signal is received from the base station. In the case where data transmission has nor been successfully carried out, a negative acknowledge (NACK) signal indicative of a retransmission request is issued from the base station. When the NACK acknowledge signal is received, the data is retransmitted to the base station.

A rechargeable battery is used as the power source of a wireless communication apparatus. As power consumption of the wireless communication apparatus is larger, the life of the battery is shorter. In order to prolong the life of a battery, therefore, power consumption of a wireless communication apparatus must be controlled so as to suppress waste power consumption.

An example of a method of reducing power consumption of a wireless communication apparatus is disclosed in Japanese Unexamined Patent Publication JP-A 10-13338 (1998). In the method, a predetermined number m of successive transmission successes is preset, and the transmission power is adjusted in the following manner. In the case where data transmission is successfully carried out m times, the transmission power is reduced by a predetermined amount. In the case where data transmission ended in failure one time, the transmission power is increased by the predetermined amount.

FIG. 8 is a flowchart showing a conventional method of automatically controlling a transmission power of a wireless communication apparatus which is disclosed in JP-A 10-13338. When the wireless communication apparatus is powered on at step S301, the apparatus is set to the initial state so that a transmission success counter which counts the number of transmission successes is initialized to set x=0 (S302).

Thereafter, the apparatus transmits data to a base station, and then waits for an answer signal, i.e., an ACK signal or a NACK signal replied from the base station (S303). at step S304, it is determined whether an ACK signal is received or not.

In the case where at step S304 it is judged that the ACK signal has been received, the transmission success counter is incremented by 1 (S305). At step S306, it is determined whether the transmission success number x is equal to the predetermined number m or not. In the case where it is judged that the transmission success number x is not equal to the predetermined number m, the process returns to step S303. In the case where the ACK signal is then again received at step S304, the transmission success counter is incremented by 1 (S305).

It is again determined at step S306 whether the ACK signal is received the predetermined number (=m) of times or not. In the case where it is judged that the signal has been received m times, the transmission power is reduced by the predetermined amount (S308), and the process then returns to the state of waiting for the answer signal (S303).

In the case where at step S304 it is judged that the NACK signal has been received, or it is judged that the ACK signal is not received, the transmission success counter is reset at step S309 to 0, and then the transmission power is immediately increased by the predetermined amount (S310). Thereafter, the process returns to step S303.

In the above conventional art, the transmission power is controlled as described above. Namely, communication is carried out while reducing power consumption, so that the transmission power at the present time has the optimum value, whereby the life of a battery is prolonged. The optimum value of the transmission power means the minimum value of the transmission power at which reception by a base station is enabled at the present time.

Next, the level transition of the transmission power in a wireless communication apparatus of the conventional art will be described. In the conventional method of automatically controlling a transmission power, the transmission power at the end of the previous communication is selected as that at the start of the present communication. FIG. 9 is a graph showing the level transition of the transmission power in a wireless communication apparatus of the conventional art in the case where the transmission power in the previous communication is higher than the optimum value of the present communication. FIG. 9 shows the level transition of the transmission power in the case where, each time when the ACK signal is successively received the predetermined number (in this example, m=3) of times, the transmission power is reduced by a predetermined amount. In this example, after reduction of the transmission power from the initial value is carried out three times, the NACK signal is received, and the transmission power is then immediately increased by the predetermined amount.

FIG. 10 is a graph showing the level transition of the transmission power in the case where the transmission power in the previous communication is lower than the optimum value of the present communication. In the example of FIG. 10, after operations of receiving the NACK signal and then immediately increasing the transmission power by the predetermined amount are carried out three times, the ACK signal is received and data transmission at the power is carried out the predetermined number (in this example, m=3) of times. In the case where these data transmissions are successfully carried out and the ACK signal is successively received m (=3) times, the transmission power is reduced by the predetermined amount. In the case where the NACK signal is then again received, the transmission power is immediately increased. Thereafter, the control is repeated in which, when the ACK signal is successively received three times, the transmission power is reduced by the predetermined amount, and, when the NACK signal is again received, the transmission power is immediately increased.

In the method of automatically controlling a transmission power of the conventional art, the transmission power is increased only by the predetermined amount as described with reference to FIG. 10. When the transmission power of the previous transmission is lower than the present optimum value by several steps, the transmission power must be increased in the several steps. Therefore, the method has such a problem that data transmission successively fails before the transmission power reaches the optimum value.

Even in a state where data transmission is carried out at the optimum transmission power, in the case where data transmission succeeds the predetermined number of times, as shown in FIG. 10, the transmission power is reduced by the predetermined amount, and therefore the possibility of data transmission failure is increased. In the case where data transmission fails, data retransmission must be carried out at an increased power. Even though the transmission power is reduced with the intention of suppressing power consumption, the power, contrarily, is wastefully used for the data retransmission.

SUMMARY OF THE INVENTION

It is an object of the invention to provide a method of automatically controlling a transmission power of a wireless communication apparatus which adjusts the transmission power so as to eliminate waste power consumption as much as possible, thereby enabling communication to be carried out at an optimum transmission power, and also a storage medium on which the method is stored.

The invention provides a method of automatically controlling a transmission power of a wireless communication apparatus in order to suppress consumed transmission power, the method comprising the steps of:

setting the transmission power to a maximum value at a start of transmission;

gradually reducing the transmission power by a predetermined amount, each time when transmission succeeds a predetermined number of times; and in the case of a transmission failure at a transmission power which is gradually reduced by the predetermined amount, determining a power which is higher by the predetermined amount than the transmission power, as an optimum value.

According to the invention, since the optimum transmission power is determined by gradually reducing the maximum transmission power at a start of communication, even in the case where the transmission power at the end of the previous communication is lower than the optimum value of the present communication, it is possible to prevent a phenomenon in which, as in the above-described conventional transmission power control method, transmission repeatedly fails before an optimum transmission power is set. Consequently, the optimum transmission power can be set without lowering the success rate of communication and consumed transmission power of the wireless communication apparatus can be suppressed. As a result, the life of a battery of the wireless communication apparatus can be prolonged, and hence the ease of use of the wireless communication apparatus is improved. Both of cases where transmission fails one time and where transmission fails plural times come under the above-mentioned transmission failure case.

Furthermore, in the invention it is preferable that the transmission failure case is one where transmission fails a predetermined number of times at a same transmission power.

According to the invention, in the case where transmission at the same transmission power fails plural number of times, a transmission power which is higher by the predetermined amount than the transmission power, is set as the optimum transmission power. Therefore, it is possible to check whether the power at which transmission fails one time is actually within a communication-disable range or not. Consequently, such a phenomenon can be prevented that, although communication is originally enabled at the power, erroneous judgment that communication at the power is impossible is caused by noises or the like, and an incorrect optimum transmission power is set, with the result that an optimum transmission power can be correctly set.

Furthermore, in the invention it is preferable that once the optimum transmission power is set, the optimum transmission power is maintained unless any transmission failure occurs.

According to the invention, the transmission power is maintained to the optimum transmission power unless any transmission failure occurs, and, unlike the conventional transmission power controlling method described above, it is not carried out to reduce the transmission power each time when transmission succeeds a predetermined number of times. Therefore, waste retransmission after the optimum transmission power is set is prevented, and consumed transmission power can be suppressed.

Furthermore, in the invention it is preferable that, in the case where a non-communication time period reaches a preset time period, transmission is carried out at the maximum transmission power, from which determination of optimum transmission power is started.

According to the invention, in the case where a non-communication time period reaches a preset time period, there is a possibility that the communication state is changed, and hence transmission power is raised to the maximum value and setting of optimum transmission power is again carried out. Therefore, it is possible to rapidly cope with a change of the communication state.

Furthermore, in the invention it is preferable that in the case where a transmission failure occurs after the optimum transmission power is set, transmission power is raised to the maximum value and resetting of optimum transmission power is carried out.

According to the invention, since occurrence of a transmission failure after the optimum transmission power is set indicates that there is a possibility that the communication state has been changed, transmission power is raised to the maximum value and resetting of optimum transmission power is carried out. Therefore, it is possible to rapidly cope with a change of the communication state.

Furthermore, in the invention it is preferable that, in the case where transmission fails at the maximum transmission power, retransmission of data is carried out with the maximum transmission power maintained.

According to the invention, since retransmission of data is carried out with the maximum transmission power maintained, transmission and reception of data can be reliably carried out.

Furthermore, in the invention it is preferable that in the case where transmission fails a predetermined number of times after the optimum transmission power is set, the transmission power is raised to the maximum value and resetting of optimum transmission power is carried out.

According to the invention, since the predetermined number of transmission failures are allowed at the optimum transmission power, a phenomenon in which, although communication is originally enabled at the optimum transmission power, erroneous judgment that communication at the power is impossible is caused by noises or the like, and setting of an incorrect optimum transmission power can be prevented. The number of transmission failures which are allowed is preferably two or more.

The invention provides a storage medium on which a method of automatically controlling a transmission power of a wireless communication apparatus in order to suppress consumed transmission power is stored, the method comprising:

setting transmission power to a maximum value at a start of communication;

thereafter gradually reducing the transmission power by a predetermined amount each time when transmission succeeds a predetermined number of times; and in the case where transmission fails at a gradually reduced transmission power, determining a power higher than the gradually reduced transmission power as an optimum transmission power.

According to the invention, optimum transmission power is determined by gradually reducing the maximum transmission power at the start of communication. Even when the transmission power at the end of the previous communication is lower than the optimum transmission power of the present communication, therefore, it is possible to prevent a phenomenon in which, as in the above-described conventional transmission power control method, transmission repeatedly fails before an optimum transmission power is determined. Consequently, without lowering the success rate of communication, the optimum transmission power can be determined and consumed transmission power of the wireless communication apparatus can be suppressed. As a result, the life of a battery of the wireless communication apparatus can be prolonged, and hence the ease of use of the wireless communication apparatus is improved. Both of cases where transmission fails one time, and where transmission fails plural times come under the above-mentioned transmission failure case.

Furthermore, in the invention it is preferable that the case where transmission fails is one where transmission at a same transmission power fails a predetermined plural number of times.

According to the invention, in the case where transmission at the same transmission power fails a plural number of times, a transmission power which is higher by the predetermined amount than the transmission power is set as the optimum transmission power. Therefore, it is possible to check whether the power at which transmission fails one time is actually within a communication-disable range or not. Consequently, a phenomenon in which, although communication is originally enabled at the power, erroneous judgment that communication at the power is impossible is caused by noises or the like, and an incorrect optimum transmission power is set can be prevented, and optimum transmission power can be correctly set.

Furthermore, in the invention it is preferable that, after the optimum transmission power is set, the optimum transmission power is maintained until any transmission failure occurs.

According to the invention, the transmission power is maintained to the optimum transmission power until any transmission failure occurs, and, unlike the above-described conventional transmission power control method, reduction of the power at each time when transmission succeeds a predetermined number of times is not carried out. Therefore, waste retransmission after the optimum transmission power is set is prevented, and consumed transmission power of a wireless communication apparatus can be suppressed.

Furthermore, in the invention it is preferable that, in the case where a non-communication time period reaches a preset time period, transmission power is raised to the maximum value and setting of optimum transmission power is carried out.

According to the invention, in the case where a non-communication time period reaches a preset time period, there is a possibility that the communication state has been changed. Accordingly the transmission power is raised to the maximum value and setting of optimum transmission power is carried out. Therefore, it is possible to rapidly cope with a change of the communication state.

Furthermore, in the invention it is preferable that in the case where transmission fails after the optimum transmission power is set, transmission power is raised to the maximum value and setting of optimum transmission power is again carried out.

According to the invention, since occurrence of a transmission failure after the optimum transmission power is set indicates that there is a possibility that the communication state has been changed, transmission power is raised to the maximum value and setting of optimum transmission power is again carried out. Therefore, it is possible to rapidly cope with a change of the communication state.

Furthermore, in the invention it is preferable that in the case where transmission fails at the maximum transmission power, retransmission of data is carried out with the maximum transmission power maintained.

According to the invention, since retransmission of data is carried out with the maximum transmission power maintained, transmission and reception of data can be carried out reliably.

Furthermore, in the invention it is preferable that in the case where transmission fails a predetermined number of times after the optimum transmission power is set, transmission power is raised to the maximum value and setting of optimum transmission power is again carried out.

According to the invention, since a predetermined number of transmission failures is allowed at the optimum transmission power, a phenomenon in which, although communication is originally enabled at the optimum transmission power, erroneous judgment that communication at the power is impossible is caused by noises or the like can be prevented. The predetermined number of failures is preferably two or more.

The invention provides a method of automatically controlling a transmission power of a wireless communication apparatus in order to suppress the transmission power, comprising:

setting transmission power at a start of communication to a maximum value;

each time when transmission succeeds a predetermined number of times, gradually reducing the transmission power by a predetermined amount;

in the case where transmission at a transmission power which is gradually reduced by the predetermined amount fails, determining a power higher than the transmission power by the predetermined amount as an optimum transmission power; and, after the optimum transmission power is set, maintaining the optimum transmission power unless any transmission failure occurs.

According to the invention, the optimum transmission power is set by gradually reducing the maximum transmission power at the start of communication by the predetermined amount. Accordingly, even when the transmission power at the end of the previous communication is lower than the optimum value of the present communication, it is possible to prevent a phenomenon in which, as in the above-described conventional transmission power control method, transmission repeatedly fails before an optimum transmission power is determined. Consequently, without lowering the success rate of communication, the optimum transmission power can be set for suppressing consumed transmission power of a wireless communication apparatus. As a result, the life of a battery of the wireless communication apparatus can be prolonged, and hence the ease of use of the wireless communication apparatus is improved. The above-mentioned case where transmission fails may be either of cases where transmission fails one time, and where transmission fails plural times. Moreover, the transmission power is maintained to the optimum transmission power until transmission fails, and, unlike the above-described conventional method of controlling a transmission power, reduction of the power at each time when transmission succeeds a predetermined number of times is not carried out. Therefore, waste retransmission after the optimum transmission power is set is prevented, and the transmission power of a wireless communication apparatus can be suppressed.

Furthermore, in the invention it is preferable that, in the case where transmission fails after the optimum transmission power is set, transmission power is raised to a maximum value and setting of the optimum transmission power is again carried out.

According to the invention, in the case where transmission fails after the optimum transmission power is set, there is a possibility that the communication state is changed, and hence transmission power is raised to the maximum value and setting of the optimum transmission power is again carried out. Therefore, it is possible to rapidly cope with a change of the communication state.

Furthermore, in the invention it is preferable that, when a non-communication time period reaches a preset time period, transmission power is raised to a maximum value and setting of the optimum transmission power is again carried out.

According to the invention, when a non-communication time period reaches a preset time period, there is a possibility that the communication state is changed, and hence transmission power is raised to the maximum value and setting of the optimum transmission power is again carried out. Therefore, it is possible to rapidly cope with a change of the communication state.

Furthermore, in the invention it is preferable that the transmission failure case is a case where transmission at a same transmission power fails a predetermined plural number of times.

According to the invention, in the case where transmission at the same transmission power fails plural number of times, a transmission power which is higher than the transmission power by the predetermined amount is set as the optimum transmission power. Therefore, it is possible to check whether the power at which transmission fails one time is actually within a communication-disable range or not. Consequently, a phenomenon in which, although communication is originally enabled at the power, erroneous judgment that communication at the power is impossible is caused by noises or the like, and an incorrect optimum transmission power is set can be prevented from occurring, and an optimum transmission power can be correctly set.

Furthermore, in the invention it is preferable that, in the case where transmission fails at the maximum transmission power, retransmission of data is carried out with the transmission power maintained at the maximum value.

According to the invention, since retransmission of data is carried out with the transmission power maintained at the maximum value, transmission and reception of data can be reliably carried out.

Furthermore, in the invention it is preferable that in the case where transmission fails a predetermined number of times after the optimum transmission power is set, transmission power is raised to a maximum value and setting of optimum transmission power is again carried out.

According to the invention, since the number of transmission failures at the optimum transmission power is set to a predetermined number, a phenomenon in which erroneous judgment that communication at the power is impossible is caused by noises or the like and an incorrect optimum transmission power is set can be prevented, and optimum transmission power can be correctly set. The number is preferably two or more.

As described above, according to the invention, the transmission power is gradually reduced from the maximum value, and a power which is higher by a predetermined amount than the power at which transmission fails is set as the optimum transmission power. Therefore, communication can be carried out at an optimum transmission power at which communication is enabled. Since the optimum transmission power is maintained until transmission fails, the number of retransmissions of data caused as a result of adjustment of the transmission power can be reduced, and a power which is consumed for retransmitting data can be suppressed. In the method of automatically controlling a transmission power of a wireless communication apparatus according to the invention, therefore, the transmission power of a wireless communication apparatus can be suppressed, and consumption of a battery of the wireless communication apparatus can be reduced. Consequently, a phenomenon in which, although communication is originally enabled at the power, erroneous judgment that communication at the power is impossible is caused by noises or the like, and an incorrect optimum transmission power is set can be prevented, and optimum transmission power can be correctly set.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
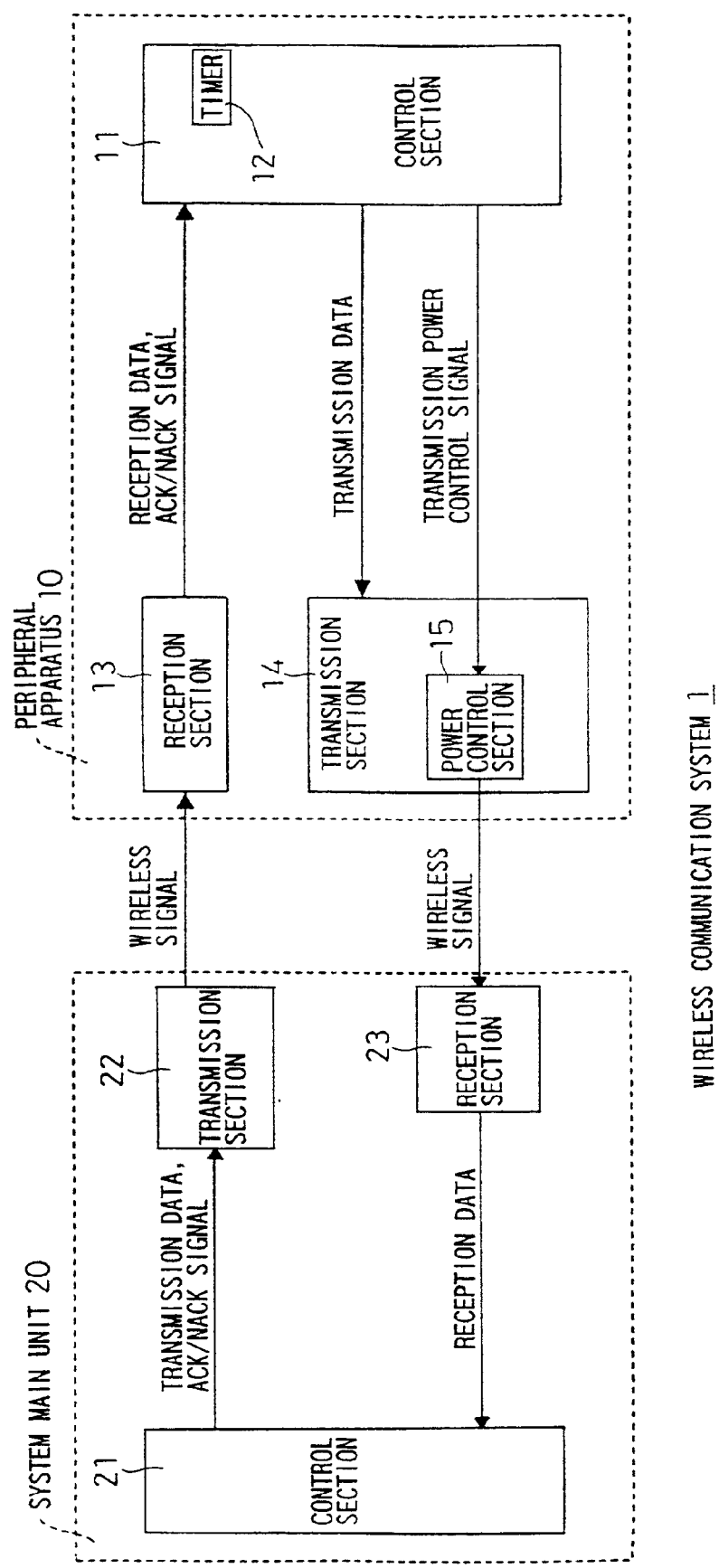
FIG. 1 is a block diagram showing a wireless communication system 1 configured by a peripheral apparatus 10 and a system main unit 20.

Now referring to the drawings, preferred embodiments of the invention are described below.

Hereinafter, an embodiment of the invention will be described with taking a wireless communication system configured by a system main unit such as a personal computer, and a peripheral apparatus which is a wireless communication apparatus, as an example. FIG. 1 is a block diagram showing the wireless communication system 1 configured by the peripheral apparatus 10 and the system main unit 20. The wireless communication system 1 is configured by: the system main unit 20 having a control section 21, a transmission section 22, and a reception section 23; and the peripheral apparatus 10 having a control section 11, a reception section 13, and a transmission section 14.

The peripheral apparatus 10 and the system main unit 20 transmit and receive data in units of a block by means of a wireless signal such as infrared rays. When the peripheral apparatus 10 which is a wireless communication apparatus transmits data to the system main unit 20, if the transmission succeeds, the peripheral apparatus 10 receives an acknowledge (ACK) signal transmitted from the system main unit 20, and, if the transmission fails, the peripheral apparatus 10 receives a negative acknowledge (NACK) signal indicative of a retransmission request. When the NACK acknowledge signal is received, the peripheral apparatus 10 retransmits the data to the system main unit 20.

Next, the peripheral apparatus 10 will be described. The reception section 13 receives from the system main unit 20 a wireless signal including reception data, and the ACK signal or the NACK signal, and passes the received data to the control section 11.

The transmission section 14 sends out the transmission data sent from the control section 11, to the system main unit 20 in the form of a wireless signal. If a power control signal sent from the control section 11 indicates increase, a power control section 15 of the transmission section 14 increases the transmission power, and, if the signal indicates reduction, reduces the transmission power.

The control section 11 performs controls relating to transmission and reception of data, including: sending transmission data given from the outside, to the transmission section 14; analyzing an answer signal transmitted from the reception section 13 to judge whether the signal is an ACK signal or a NACK signal; and sending a power reducing signal or a power increasing signal to the power control section 15 of the transmission section 14 as the transmission power control signal. The control section 11 has a timer 12. The control section has functions such as that a time period when transmission and reception of data are not carried out is measured, and, in the case where communication is not carried out for a given time period, a signal instructing maximization of the transmission power is sent to the transmission section 14; and that a time period elapsing after transmission of data is measured, and, when a response to the transmission data is not obtained for a predetermined time period, it is judged that the transmission fails, and a retransmission process is effected.

Next, the system main unit 20 will be described. The reception section 23 receives the wireless signal transmitted from the peripheral apparatus 10, and passes the signal as reception data to the control section 21. The transmission section 22 transmits the transmission data, the ACK signal or the NACK signal, and the like to the peripheral apparatus 10.

The control section 21 sends data which are to be transmitted, to the transmission section 22, and receives the reception data from the reception section 23 to check an error. In the case where there is no error, the control section sends the ACK signal to the transmission section 22 in the case where there is no error, and the NACK signal to the transmission section in the case where any error is present.

A rechargeable battery is used as the power source of the peripheral apparatus 10. As power consumption of the peripheral apparatus 10 is larger, the life of the battery is shorter. In order to prolong the life of the battery, therefore, the power consumption of the peripheral apparatus 10 must be controlled so as to suppress waste power consumption.

Next, a method of automatically controlling the transmission power of the peripheral apparatus 10 which is driven by the battery will be described. In the peripheral apparatus 10, communication is started at transmission power raised to the maximum value. Each time when transmission succeeds a predetermined number of times, the transmission power is reduced in a step of a predetermined amount. In the case where transmission at a transmission power which is reduced by the predetermined amount fails a predetermined number of times, a power which is higher than the transmission power by the predetermined amount is set as an optimum transmission power. The optimum transmission power is maintained until transmission fails.

In the case where no answer signal is returned for a predetermined time period when or after the optimum transmission power is set, it is judged that the transmission fails, and transmission power is raised to the maximum value and setting of the optimum transmission power is again carried out. The predetermined amount by which the transmission power is reduced or increased is previously given from the outside to the control section 11 to be set therein.

The above-described method of automatically controlling a transmission power is stored in the form of a program into a storage medium such as a ROM (Read Only Memory) which is disposed in the control section 11 of the peripheral apparatus 10. It is assumed that the system main unit 20 performs communication at a constant transmission power.

Figure 2:
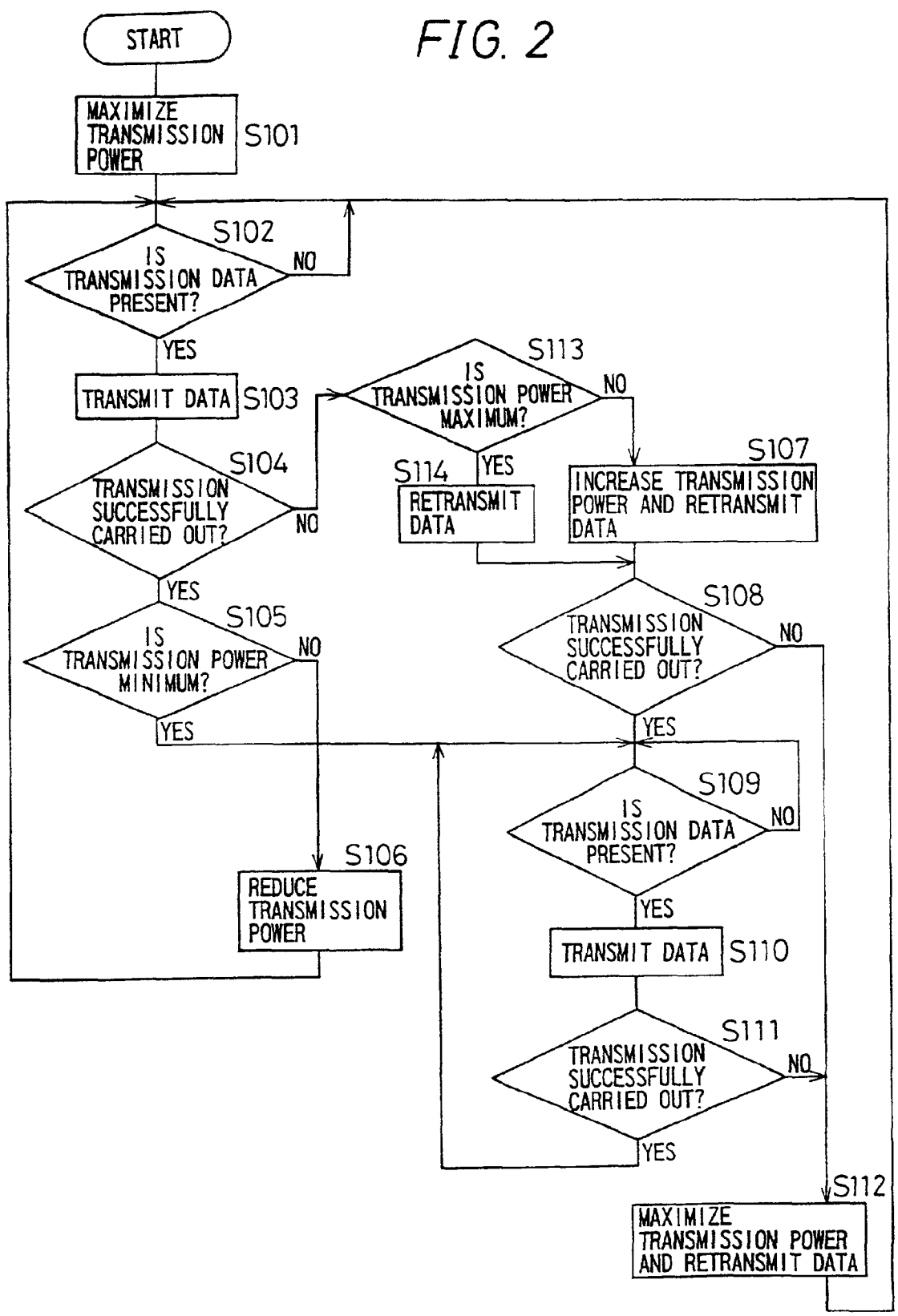
FIG. 2 is a flowchart showing a method of automatically controlling a transmission power of the peripheral apparatus 10 which is an embodiment of the invention.

FIG. 2 is a flowchart showing a method of automatically controlling a transmission power of the peripheral apparatus 10 which is an embodiment of the invention. In the method of automatically controlling a transmission power shown in FIG. 2, the predetermined amount by which the transmission power is reduced or increased is set, and both the predetermined numbers for transmission success and transmission failure are set to one.

At step S101, the peripheral apparatus 10 sets the initial state of the transmission power to the maximum value. Then, it is determined whether there is transmission data or not (S102). In the case where at step s102 it is judged that transmission data is present, at step s103 the data is transmitted to the system main unit 20. After the data transmission, the control section 11 determines at step S104 whether data is correctly transmitted or not. In the case where the peripheral apparatus 10 has received the ACK signal from the system main unit 20, it is judged that transmission is successfully carried out, and in the case where the peripheral apparatus has received the NACK signal or could not receive any answer signal, it is judged that the transmission failed, and the data must be retransmitted.

In the case whereat step S104 it is judged that the ACK signal has been received and transmission has been successfully carried out, the control section 11 determines whether the transmission power is minimum or not (S105). In the case where the transmission power is not minimum, the transmission power is reduced by the predetermined amount (preset at step S106), and the process then returns to step S102. In the case where at step S105 the transmission power is judged as being minimum, the process transfers to step S109.

In the case where at step S104 it is judged that the NACK signal has been received or transmission has failed because any answer signal cannot be received, the control section 11 determines whether the transmission power is maximum or not (S113). In the case where it is judged that the transmission power is not maximum, the transmission power is immediately increased by the predetermined amount or returned to the immediately previous power value, and then the data is retransmitted (S107). In the case where the transmission power is judged as being maximum, retransmission of data is carried out with the transmission power maintained at the maximum value. If it is judged at step S108 that transmission succeeds, the power value is set as an optimum transmission power, and the process then transfers to step S109. Thereafter, in order to avoid waste transmission, the sequence of steps S109 to S111 is repeated while maintaining the transmission power to the optimum transmission power, until it is judged at step S111 that the transmission failed.

In the case where it is judged at step S108 or S111 that transmission fails, there is a possibility that the communication state is changed, and hence the transmission power is returned to the maximum value (S112). The process then returns to step S102 to again set the transmission power.

Figure 3:
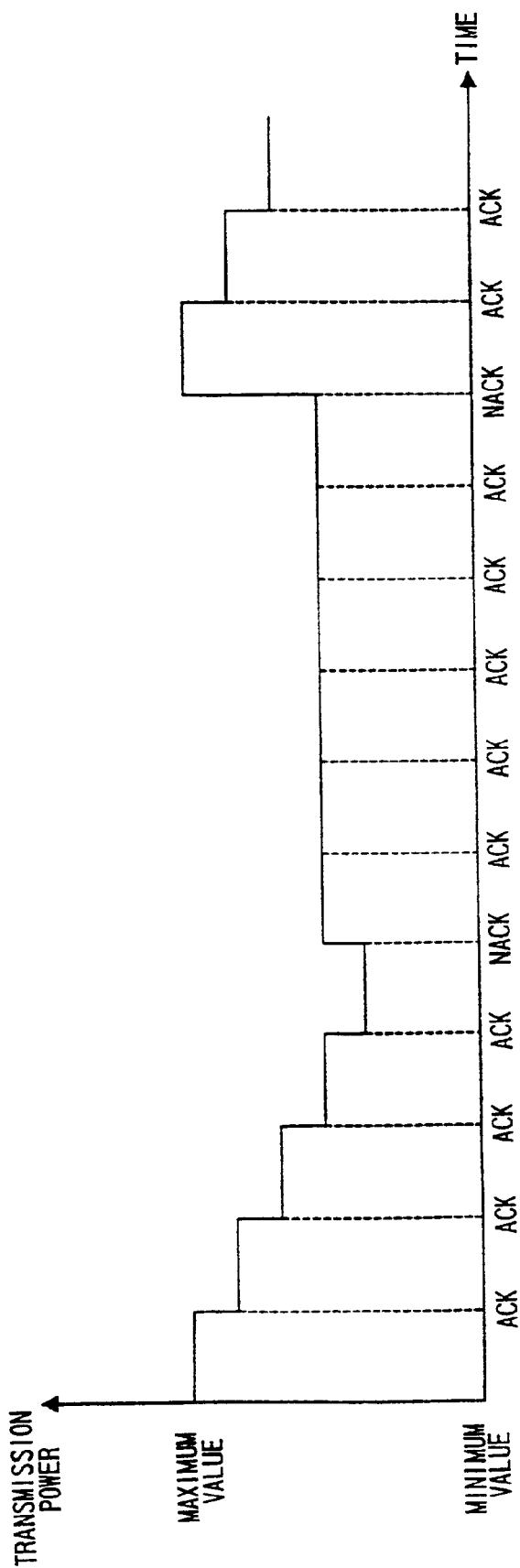
FIG. 3 is a graph showing the level transition of the transmission power in the method of automatically controlling a transmission power of the peripheral apparatus 10 which is the one embodiment of the invention.

FIG. 3 is a graph showing the level transition of the transmission power in the method of automatically controlling a transmission power which is shown in FIG. 2. FIG. 3 shows that transmission is first carried out at the maximum transmission power; after the ACK signal is received one time and the operation of reducing the transmission power by the predetermined amount is repeated four times, the NACK signal is received, the transmission power is increased by the predetermined amount or returned to the immediately previous state to carry out retransmission. Thereafter, the ACK signal is received as a result of the retransmission. The power is maintained as the optimum transmission power until the NACK signal is then received. When transmission is repeated and the NACK signal is received, the power is returned to the maximum value, and setting of the optimum transmission power is again carried out.

Figure 4:
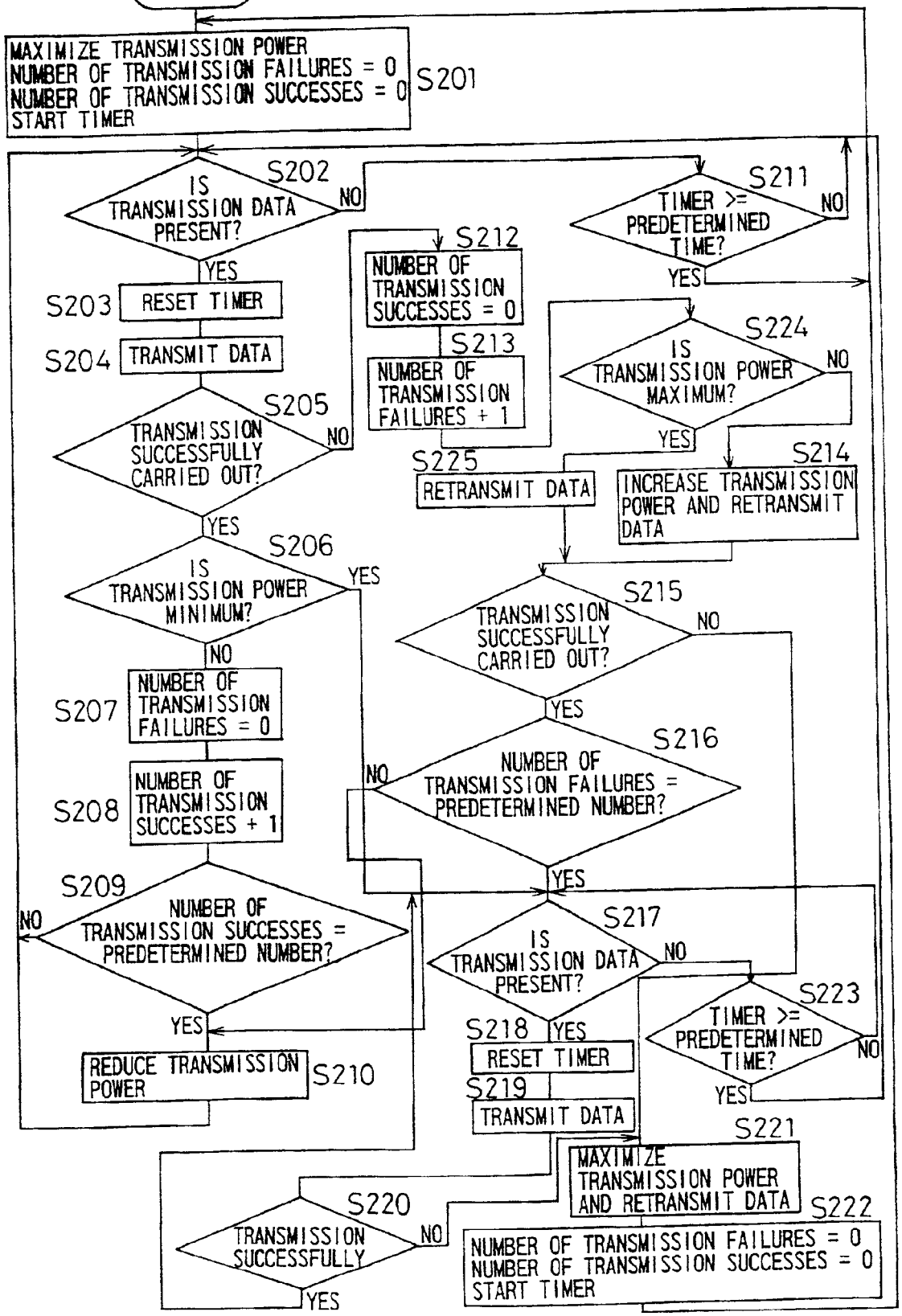
FIG. 4 is a flowchart showing a method of automatically controlling a transmission power of the peripheral apparatus 10 which is another embodiment of the invention.

FIG. 4 is a flowchart showing a method of automatically controlling a transmission power of the peripheral apparatus 10 which is another embodiment of the invention. In the method of automatically controlling a transmission power, the predetermined time period of the timer 12, the predetermined amount by which the transmission power is increased, the predetermined amount by which the transmission power is reduced, the predetermined number of transmission successes, and the predetermined number of transmission failures are previously set.

At step S201, an initial state of the peripheral apparatus 10 is set, namely the transmission power is set to the maximum value, and a transmission success counter, a transmission failure counter, and the timer 12 counter are set to the initial value "0". Then, at step S202 whether transmission data is present or not is determined. In the case where it is judged that transmission data is present, the timer 12 is reset at step S203, and at step S204 the peripheral apparatus 10 transmits the data to the system main unit 20. At step S205, judgment on transmission success or failure is carried out by checking whether the answer signal issued from the system main unit 20 is the ACK signal or NACK signal.

In the case where the ACK signal is received and it is judged that the transmission has succeeded, it is determined at step S206 whether the transmission power is minimum or not. In the case where the transmission power is not minimum, the transmission failure counter is cleared (S207), and the transmission success counter is incremented by 1 (S208). At step S209, the value of transmission successes counter is compared with the preset predetermined number of transmission successes (the threshold number of transmission successes). In the case where the numbers are not equal to each other, the process returns to step S202. In the case where the numbers are equal to each other, the transmission power is reduced at step S210 by the preset predetermined amount, and the process returns to step S202. In the case where the judgment at step S206 proves that the transmission power is minimum, the process transfers to step S217.

In the case where it is judged at step S205 that the transmission fails because the NACK signal is received or any answer signal cannot be received, the transmission success counter is reset to zero (S212), the transmission failure counter is incremented by 1 (S213), the control section 11 determined whether the transmission power is maximum or not (S224). If the transmission power is not maximum, the transmission power is immediately increased by the predetermined amount (S214). In the case where the transmission power is maximum, data retransmission is carried out while the transmission power is maintained at the maximum value (S225).

At step S215, it is judged whether retransmission succeeds or not. In the case where retransmission succeeds, the value of the transmission failure counter is compared with the preset predetermined number of transmission failures (the threshold number of transmission failures) (S216). In the case where they are not equal to each other, the transmission power is reduced by the predetermined amount (S210), and the process then returns to step S202 to wait for production of transmission data.

In the case where it is judged at step S216 that the transmission failure counter is equal to the preset predetermined number of transmission failures, the process transfers to step S217 to enter the state of waiting for transmission data. Thereafter, during a period when data transmission succeeds and communication is continued, steps S217 to S220 are repeated while the transmission power which has been increased at step S214 or the maximum transmission power at step S225 is maintained as the optimum transmission power, and an operation of reducing the transmission power is not carried out even when transmission succeeds. Therefore, waste transmission can be suppressed.

In the case where, after the optimum transmission power is set, it is judged at step S220 that transmission fails, there is a possibility that the communication state is changed, and hence retransmission is carried out at step S221 while the transmission power is returned to the maximum value. The transmission failure counter, the transmission success counter, and the timer 12 are returned to the initial setting (S222). The process then returns to step S202 to again set the transmission power.

In the case where it is judged at step S215 that retransmission fails, data is retransmitted while the transmission power is increased to the maximum value in order to prevent transmission failure from successively occurring (S221). Thereafter, the transmission failure counter, the transmission success counter, and the timer 12 are returned to their respective initial values (S222). The process then returns to step S202 to again set the transmission power.

At steps S211 and S223, the elapsed time measured by the timer 12 is checked. In the case where the non-communication time period continues for a preset predetermined time period, there is a possibility that the communication state is changed. Therefore, initialization is carried out (S201), and setting of the optimum transmission power is again carried out.

The predetermined number of transmission successes (the threshold number of transmission successes), that of transmission failures (the threshold number of transmission failures), the predetermined amount by which the transmission power is reduced, that by which the transmission power is increased, and the predetermined time period of the timer are set to respective optimum values in accordance with the wireless communication system.

In the control method shown in FIG. 4, the predetermined number of transmission failures is set to be plural, transmission is repeatedly tried until the number of transmission failures reaches the predetermined number, and the optimum transmission power is then set. Therefore, the method is hardly affected by noises or the like, as compared with the control method shown in FIG. 2 in which the predetermined number of transmission failures is set to one.

Figure 5:
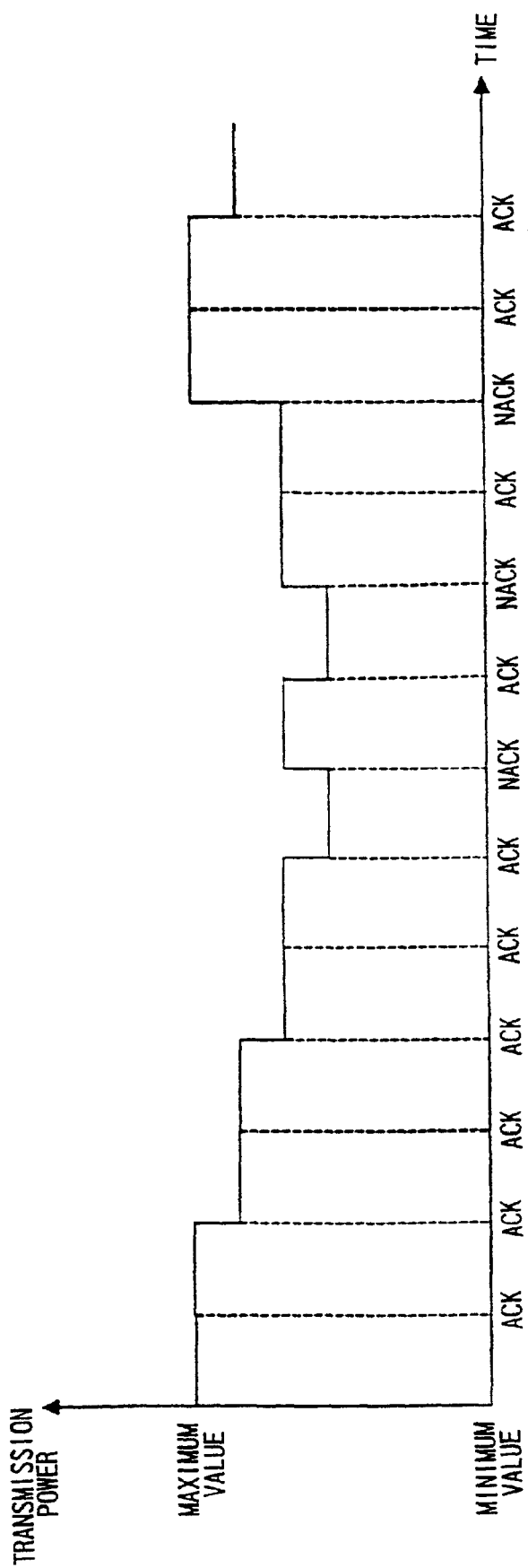
FIG. 5 is a graph showing the level transition of the transmission power in the method of automatically controlling a transmission power of the peripheral apparatus 10 which is the other embodiment of the invention.

FIG. 5 is a graph showing the level transition of the transmission power in the method of automatically controlling a transmission power which is shown in FIG. 4. FIG. 5 shows the case where both the predetermined numbers for transmission success and transmission failure are set to two. First, transmission is first carried out at the maximum transmission power. After the ACK signal is successively received two times and the operation of reducing the transmission power by the predetermined amount is repeated three times, the NACK signal is received, and retransmission is carried out with the transmission power increased by the predetermined amount. Immediately after the retransmission, the ACK signal is received, and transmission is carried out with the transmission power again reduced by the predetermined amount. With respect to the same transmission power, the NACK signal is then again received. As a result, the number of transmission failures is equal to the predetermined number. Therefore, it is judged that the communication power is too low, and the transmission power is increased by the predetermined amount. The increased power is set as the optimum transmission power. The power is maintained until the NACK signal is then received. When the NACK signal has been received, the power is returned to the maximum value, and the setting is then again performed.

As described above, in the methods of automatically controlling a transmission power shown in FIGS. 2 to 5, waste power consumption can be suppressed without substantially lowering the success rate of communication, the optimum transmission power corresponding to the communication state can be automatically set, and hence consumption of the battery of the wireless communication apparatus can be reduced.

Figure 6:
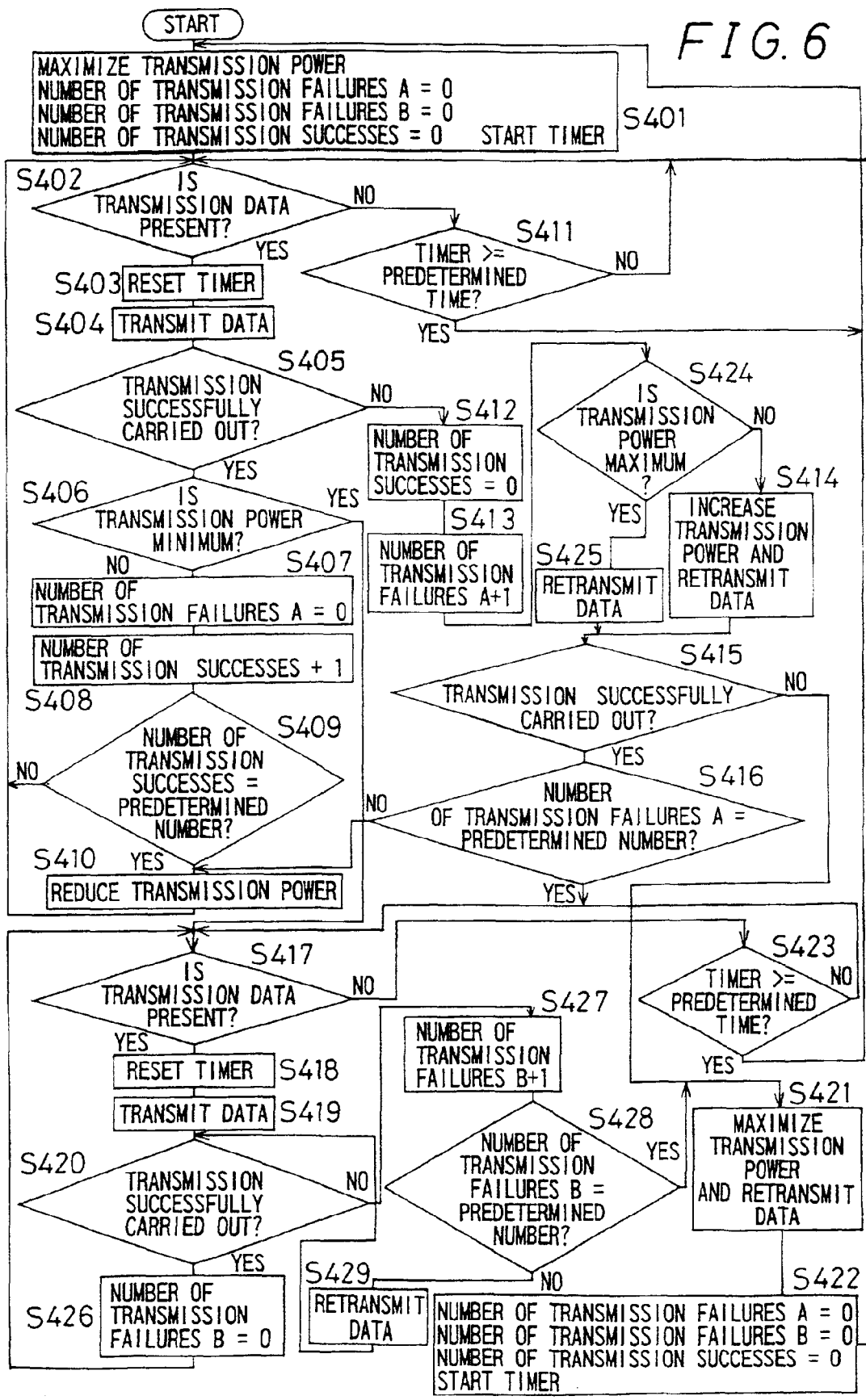
FIG. 6 is a flowchart showing a method of automatically controlling a transmission power of the peripheral apparatus 10 which is further another embodiment of the invention.

FIG. 6 is a flowchart showing a method of automatically controlling a transmission power of the peripheral apparatus 10 of further another embodiment of the invention. In the method of automatically controlling a transmission power are previously set the predetermined time period of the timer 12, the predetermined amount by which the transmission power is increased, the predetermined amount by which the transmission power is reduced, the predetermined number of transmission successes, and the predetermined numbers of transmission failures A and transmission failures B. The transmission failure A means a transmission failure which occurs in searching the optimum transmission power and the transmission failure B means a transmission failure which occurs in maintaining the optimum transmission power.

At step S401, the initial state of the peripheral apparatus 10 is set, in which the transmission power is set to the maximum value, and a transmission success counter, a transmission failure counter A, a transmission failure counter B, and a counter of the timer 12 are set to the initial value "0". Then, whether there is transmission data or not is determined at step S402. In the case where it is judged that transmission data is present, the counter of the timer 12 is returned to the initial value at step S403, and at step S404 the peripheral apparatus 10 transmits the data to the system main unit 20. At step S405, whether a response signal from the system main unit 20 is an ACK signal or NACK signal is checked to judge whether the transmission has succeeded or not.

In the case where it is judged at step S405 that the ACK signal is received and transmission succeeds, the control section 11 determines at step S406 whether the transmission power is minimum or not. In the case where the transmission power is not minimum, the transmission failure counter A is cleared (S407), and the transmission success counter is incremented by 1 (S408). At step S409, the value of transmission successes counter is compared with the preset predetermined number of transmission successes (the threshold of the number of transmission successes). In the case where the numbers are not equal to each other, the process returns to step S402. In the case where the numbers are equal to each other, the transmission power is reduced at step S410 by the preset predetermined amount, and the process returns to step S402. In the case where the judgment at step S406 proves that the transmission power is minimum, the process transfers to step S417.

In the case where it is judged at step S405 that the NACK signal is received and transmission fails or that any answer signal cannot be received, the transmission success counter is reset to 0 (S412), the transmission failure counter A is incremented by 1 (S413), the control section 11 judges whether the transmission power is maximum or not (S424). In the case where the transmission power is not maximum, the transmission power is immediately increased by the predetermined amount (S414), in the case where the transmission power is maximum, retransmission of data is carried out with the transmission power maintained at the maximum value (S425).

When it is judged at step S415 that transmission successes, In the case wherein the case where it is judged at step S416 that the value of the transmission failure counter A is equal to the preset predetermined number of transmission failures A (the threshold number of transmission failures with respect to the same power in searching the optimum transmission power), the process transfers to step S417 to enter the state of waiting for transmission data. Thereafter, during a period when data transmission succeeds and communication is continued, a series of processes at steps S417 to S420 and at step S426 are repeated while the transmission power which has been increased at step S414 or the transmission power at step S425 is maintained as the optimum transmission power. Therefore, since an operation of reducing the transmission power is not carried out even when transmission succeeds, waste transmission can be suppressed.

In the case where, after the optimum transmission power is set, it is judged at step S420 that transmission fails, the transmission failure counter B is incremented by 1 (S427). At step S428, the value of transmission failure counter B is compared with the preset predetermined number of transmission failures B (the threshold number of transmission failures in maintaining the value of the optimum transmission power). In the case where the numbers are not equal to each other, retransmission of data is carried out (S429), the process returns to step S420. In the case where the numbers are equal to each other, there is a possibility that the communication state is changed, and hence retransmission is carried out with the transmission power returned to the maximum value (S421). The transmission failure counter A, the transmission failure counter B, the transmission success counter, and the timer 12 are returned to the initial setting (S422). The process then returns to step S402 to again set the value of the transmission power.

In the case where it is judged at step S415 that retransmission fails, data is retransmitted while the transmission power is increased to the maximum value in order to prevent transmission failure from successively occurring (S421). Thereafter, the transmission failure counter A, the transmission failure counter B, the transmission success counter, and the timer 12 are returned to their respective initial values (S422). The process then returns to step S402 to again set the transmission power.

At steps S411 and S423, the elapsed time measured by the timer 12 is checked. When the non-communication time period continues for a preset predetermined time period, there is a possibility that the communication state is changed. Therefore, initialization is carried out (S401), and setting of the optimum transmission power is again carried out.

The predetermined numbers of transmission successes, transmission failures A and transmission failures B, the predetermined amount by which the transmission power is reduced, predetermined amount by which the transmission power is increased, and the predetermined time period of the timer are set to respective optimum values in accordance with the wireless communication system.

In the control method shown in FIG. 6, after the optimum transmission power is set, the predetermined number of transmission failures is set to be two or more, transmission is repeatedly tried until the number of transmission failures reaches the predetermined number. Therefore, the method has the advantage of hardly being affected by noises or the like, as compared with the control method shown in FIGS. 2 and 4 in which the predetermined number of transmission failures at the optimum value of the transmission power is set to 1.

Figure 7:
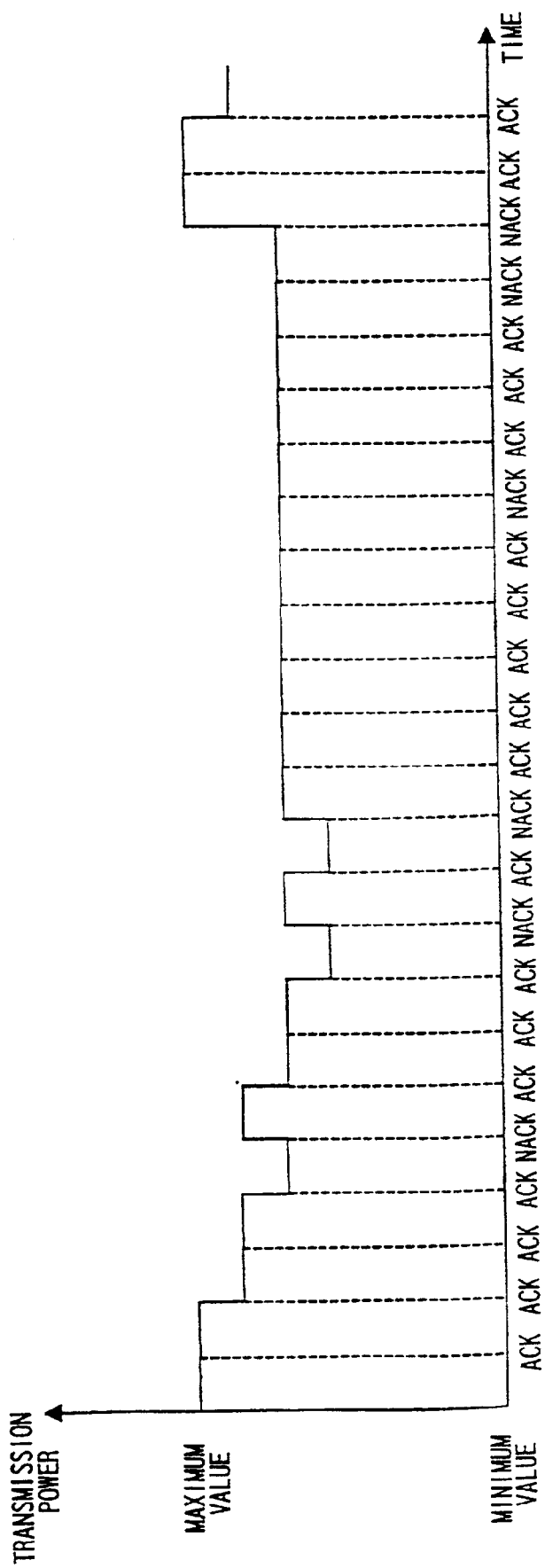
FIG. 7 is a graph showing the level transition of the transmission power in the method of automatically controlling a transmission power of the peripheral apparatus 10 which is the further other embodiment of the invention.
Figure 8:
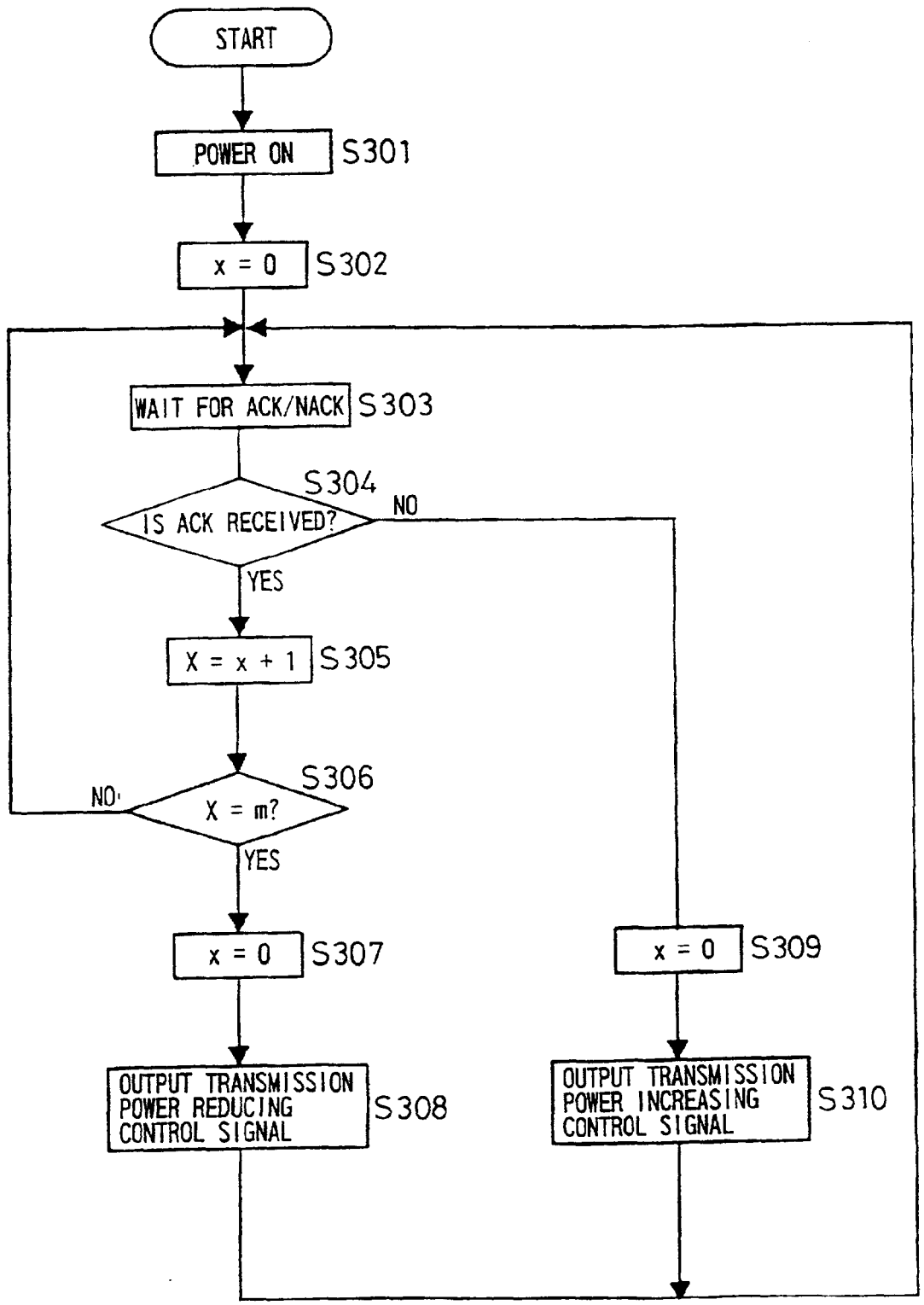
FIG. 8 is a flowchart showing a conventional method of automatically controlling a transmission power of a wireless communication apparatus which is disclosed in Japanese Unexamined Patent Publication JP-A 10-13338 (1998)
Figure 9:
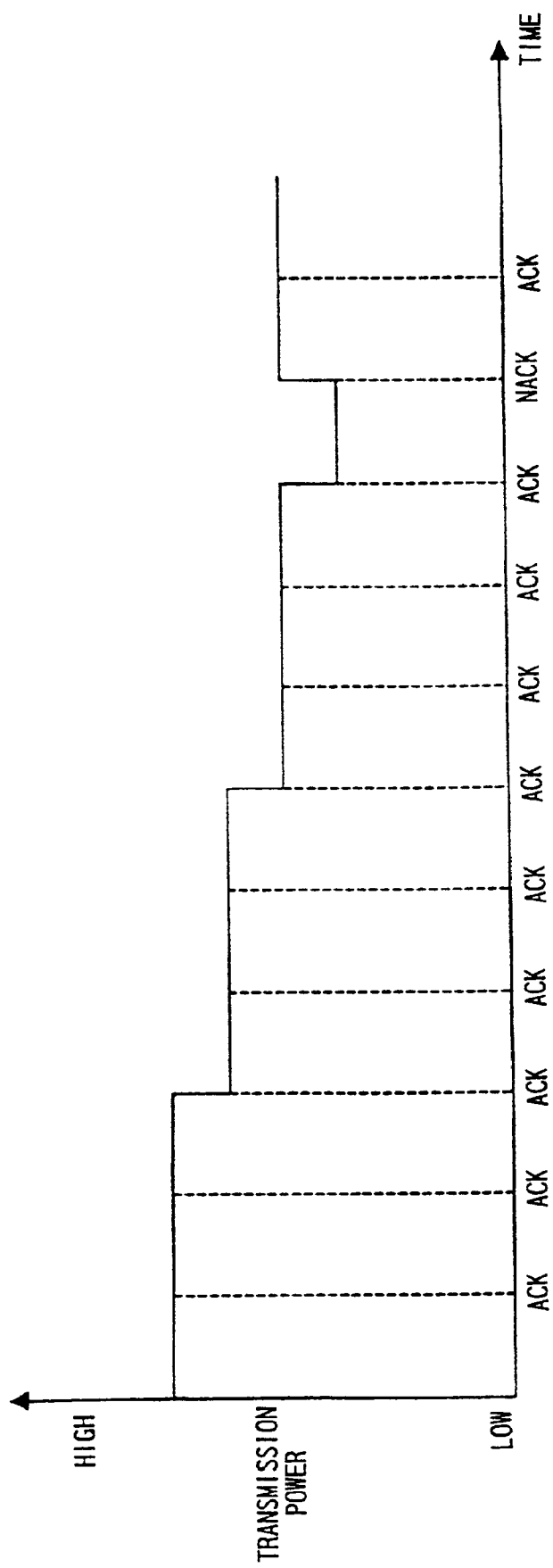
FIG. 9 is a graph showing the level transition of the transmission power in a wireless communication apparatus of the conventional art in the case where the transmission power in the previous communication is higher than the optimum value of the present communication.
Figure 10:
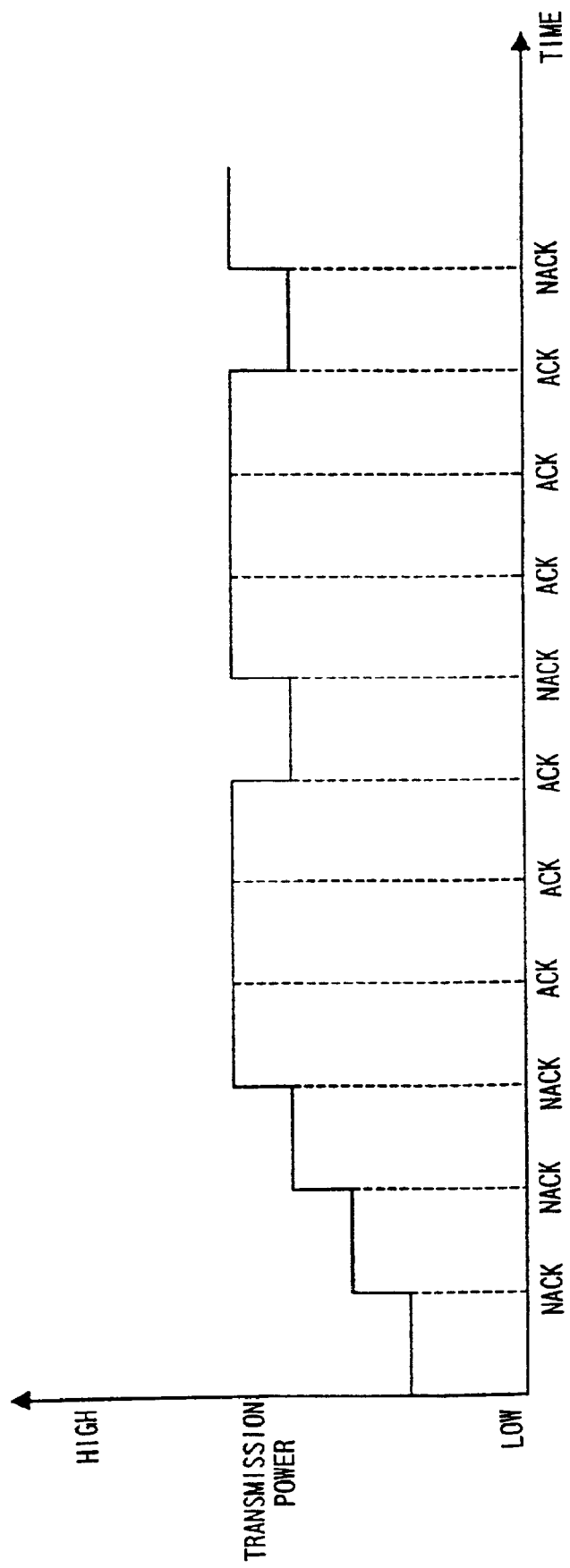
FIG. 10 is a graph showing the level transition of the transmission power in the case where the transmission power in the previous communication is lower than the optimum value of the present communication.

FIG. 7 is a graph showing the level transition of the transmission power in the method of automatically controlling a transmission power which is shown in FIG. 6. In FIG. 7 is shown the case where the predetermined numbers of transmission successes, transmission failures A and transmission failures B (thresholds) are set to two, respectively. First, when transmission is first carried out at the maximum transmission power, the ACK signal is successively received two times, and the operation of reducing the transmission power by the predetermined amount is repeated two times, the NACK signal is received, and retransmission is carried out with the transmission power increased by the predetermined amount. Immediately after the retransmission, in the case where the ACK signal is received, transmission is carried out with the transmission power again reduced by the predetermined amount. When the ACK signal is successively received two times, transmission is carried out with the transmission power further reduced by the predetermined amount. In the case where the NACK signal is received with respect to the transmission at the further reduced transmission power, retransmission is carried out with transmission power increased by the predetermined amount. Immediately after the retransmission, in the case where the ACK signal is received, transmission is carried out with the transmission power again reduced by the predetermined amount. However, the NACK signal is received with the same transmission power, and the number of transmission failures became equal to the predetermined number of times (in the embodiment, the predetermined number of times is set to two). Therefore, the transmission power is judged as being too low, and the transmission power is increased by the predetermined amount. The increased power is set as the optimum transmission power. The power is maintained until the NACK signal is successively received two times. When the NACK signal is successively received two times and the number of transmission failures B with respect to the same power becomes equal to the predetermined number (in the embodiment, the predetermined number is set to two), the power is returned to the maximum value, and the setting is again carried out.

In the embodiments, the example in which a peripheral apparatus of a personal computer is used as a wireless communication apparatus has been described. The invention may be applied also to other wireless communication apparatuses such as a cordless handset of a cordless telephone, or a portable telephone.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method of automatically controlling a transmission power of a wireless communication apparatus in order to suppress consumed transmission power, the method comprising the steps of:

setting the transmission power to a maximum value at a start of transmission;

gradually reducing the transmission power by a predetermined amount, each time when transmission succeeds a predetermined number of times; and in the case of a transmission failure at a transmission power which is gradually reduced by the predetermined amount, determining a power which is higher by the predetermined amount than the transmission power, as an optimum value.

2. The method of claim 1, wherein the transmission failure case is one where transmission fails a predetermined number of times at a same transmission power.

3. The method of claim 1, wherein once the optimum transmission power is set, the optimum transmission power is maintained unless any transmission failure occurs.

4. The method of claim 1, wherein in the case where a non-communication time period reaches a preset time period, transmission is carried out at the maximum transmission power, from which determination of optimum transmission power is started.

5. The method of claim 1, wherein in the case where a transmission failure occurs after the optimum transmission power is set, transmission power is raised to the maximum value and resetting of optimum transmission power is carried out.

6. The method of claim 1, wherein in the case where transmission fails at the maximum transmission power, retransmission of data is carried out with the maximum transmission power maintained.

7. The method of claim 1, wherein in the case where transmission fails a predetermined number of times after the optimum transmission power is set, the transmission power is raised to the maximum value and resetting of optimum transmission power is carried out.

8. A storage medium on which a method of automatically controlling a transmission power of a wireless communication apparatus in order to suppress consumed transmission power is stored, the method comprising:

setting transmission power to a maximum value at a start of communication;

thereafter gradually reducing the transmission power by a predetermined amount each time when transmission succeeds a predetermined number of times; and in the case where transmission fails at a gradually reduced transmission power, determining a power which is higher by the predetermined amount than the transmission power as an optimum transmission power.

9. The storage medium of claim 8, wherein the case where transmission fails is one where transmission at a same transmission power fails a predetermined plural number of times.

10. The storage medium of claim 8, wherein after the optimum transmission power is set, the optimum transmission power is maintained until any transmission failure occurs.

11. The storage medium of claim 8, wherein in the case where a non-communication time period reaches a preset time period, transmission power is raised to the maximum value and setting of optimum transmission power is carried out.

12. The storage medium of claim 8, wherein in the case where transmission fails after the optimum transmission power is set, transmission power is raised to the maximum value and setting of optimum transmission power is again carried out.

13. The storage medium of claim 8, wherein in the case where transmission fails at the maximum transmission power, retransmission of data is carried out with the maximum transmission power maintained.

14. The storage medium of claim 8, wherein in the case where transmission fails a predetermined number of times after the optimum transmission power is set, transmission power is raised to the maximum value and setting of optimum transmission power is again carried out.

15. A method of automatically controlling a transmission power of a wireless communication apparatus in order to suppress the transmission power, comprising:

setting transmission power at a start of communication to a maximum value;

each time when transmission succeeds a predetermined number of times, gradually reducing the transmission power by a predetermined amount;

in the case where transmission at a transmission power which is gradually reduced by the predetermined amount fails, determining a power higher than the transmission power by the predetermined amount as an optimum transmission power; and, after the optimum transmission power is set, maintaining the optimum transmission power unless any transmission failure occurs.

16. The method of claim 15, wherein in the case where transmission fails after the optimum transmission power is set, transmission power is raised to a maximum value and setting of optimum transmission power is again carried out.

17. The method of claim 15, wherein when a non-communication time period reaches a preset time period, transmission power is raised to a maximum value and setting of optimum transmission power is again carried out.

18. The method of claim 15, wherein the transmission failure case is a case where transmission at a same transmission power fails a predetermined plural number of times.

19. The method of claim 15, wherein in the case where transmission fails at the maximum transmission power, retransmission is carried out with the transmission power maintained at the maximum value.

20. The method of claim 15, wherein in the case where transmission fails a predetermined number of times after the optimum transmission power is set, transmission power is raised to a maximum value and setting of optimum transmission power is again carried out.

21. A method of automatically controlling a transmission power of a wireless communication apparatus comprising the steps of:

a) setting the transmission power to a maximum level;

b) transmitting at least one transmission at the maximum power level;

c) determining whether the at least one transmission was successful or unsuccessful;

d) each time the at least one transmission is successful, reducing the transmission power by a predetermined amount to a subsequent level;

e) repeating steps c and d until the at least one transmission at the subsequent level is unsuccessful;

f) increasing the power level by the predetermined amount to an optimal power level; and g) transmitting at the optimal power level until at least one transmission at the optimal power level is unsuccessful.

22. The method of claim 21 including the additional step of increasing the power level to the maximum level after at least one transmission at the optimal power level is unsuccessful.

23. A storage medium on which a method of automatically controlling a transmission power of a wireless communication apparatus is stored, the method comprising the steps of:

a) setting the transmission power to a maximum level;

b) transmitting at least one transmission at the maximum power level;

c) determining whether the at least one transmission was successful or unsuccessful;

d) each time the at least one transmission is successful, reducing the transmission power by a predetermined amount to a subsequent level;

e) repeating steps c and d until the at least one transmission at the subsequent level is unsuccessful;

f) increasing the power level by the predetermined amount to an optimal power level; and g) transmitting at the optimal power level until at least one transmission at the optimal power level is unsuccessful.

24. The storage medium of claim 23 wherein said method includes the additional step of increasing the power level to the maximum level after at least one transmission at the optimal power level is unsuccessful.

* * * * *